United States Patent
Shur et al.

(10) Patent No.: US 6,259,701 B1
(45) Date of Patent: Jul. 10, 2001

(54) METHOD AND SYSTEM FOR A UNICAST ENDPOINT CLIENT TO ACCESS A MULTICAST INTERNET PROTOCOL (IP) SESSION

(75) Inventors: David Hilton Shur, Middletown; Aleksandr Zelezniak, Matawan, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/927,426

(22) Filed: Sep. 11, 1997

(51) Int. Cl.⁷ ................................. H04L 12/28; H04J 3/26
(52) U.S. Cl. ......................... 370/401; 370/252; 370/432
(58) Field of Search ................................. 370/252, 253, 370/254, 400, 401, 408, 432, 390, 392; 709/203, 204, 206, 205, 227, 228, 229, 230, 231

(56) References Cited

U.S. PATENT DOCUMENTS

| | | | |
|---|---|---|---|
| 5,608,726 | * 3/1997 | Virgile | 370/401 |
| 5,768,513 | * 6/1998 | Kuthyar | 709/204 |
| 5,778,187 | * 7/1998 | Monteiro | 709/231 |
| 5,822,523 | * 10/1998 | Rothschild et al. | 709/206 |
| 5,828,839 | * 10/1998 | Momcreiff | 709/204 |
| 5,862,330 | * 1/1999 | Anupam | 709/204 |
| 5,867,653 | * 2/1999 | Aras | 709/204 |
| 5,983,005 | * 11/1999 | Momteiro | 709/231 |
| 6,018,766 | * 1/2000 | Samuel | 709/206 |

OTHER PUBLICATIONS

Djahandari K, Sterne D E: 1997 IEEE Symposium on Security and Privacy May 97, pp. 72–81, "An Mbone Proxy for an Application Gateway Firewall".

Cheriton D.R.Et Al: Weight Fuel Cell Electrodes, Sep. 10, 1995, pp. 172–179, "Host Groups: A Multicast Extension for Datagram Internetworks".

Hughes L: Computer Communications, vol. 12, No. 3, Jun. 1989, pp. 123–130 "Gateway Designs for Internetwork Multicast Communication".

Holfelder W: Interactive Distributed Multimedia Systems and Telecommunications Service, Sep. 10, 1997, pp. 450–463; "Interactive Remote Recording and Playback of Multicast Videoconferences".

* cited by examiner

Primary Examiner—Wellington Chin
Assistant Examiner—Steven Nguyen

(57) ABSTRACT

Unicast endpoint clients (110, 111, 115) on an IP Unicast network (107, 108) are provided access to Multicast sessions on an IP Multicast network (101) through a Multicast-Unicast gateway server (120, 121). The server obtains information about sessions on the Multicast network and makes such information available to a Unicast client on the Unicast network upon request by the client. Upon being presented with a list describing the subject matter of each session, the user at the Unicast client selects the session to which he or she wants to join, which causes the Multicast-Unicast server to join the appropriate session on behalf of the requesting client for each media type in which the joining client wants to be a participant. The server then sets a bidirectional Unicast User Datagram Protocol (UDP) stream between itself and the client. All packets then received by the server from the Unicast client are address-translated to the appropriate Multicast session address. In addition, all packets received by the server on the Multicast session address are address-translated and sent to the Unicast client. The Unicast client is then able to participate in the Multicast session as both a sender and a receiver of packets to and from other Unicast and Multicast clients which are active during the session. Further, the Unicast client is capable of creating a new session, recording a session in the network for later retrieval and playback, and creating and accessing low bandwidth versions of existing sessions.

15 Claims, 7 Drawing Sheets

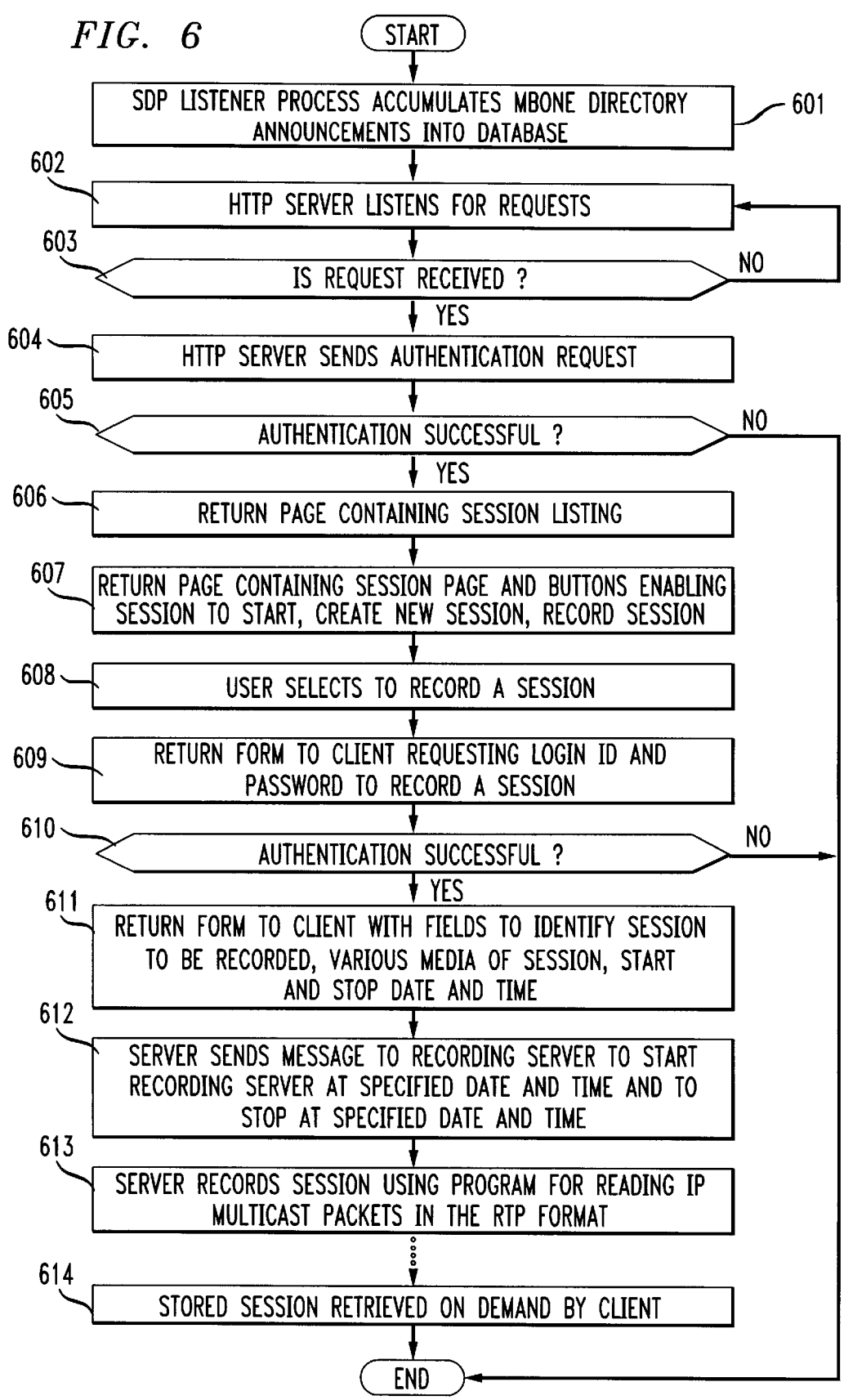

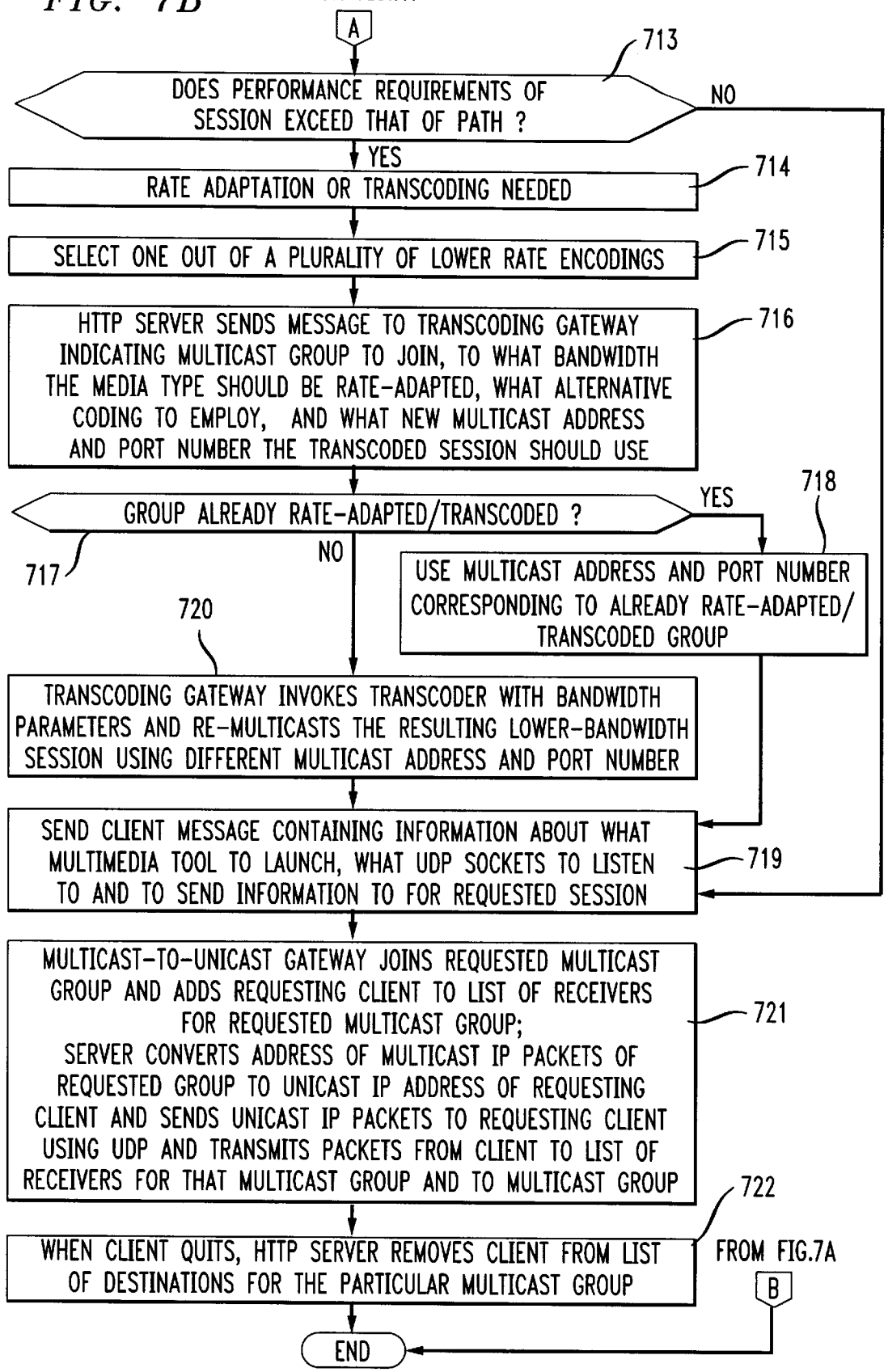

METHOD AND SYSTEM FOR A UNICAST ENDPOINT CLIENT TO ACCESS A MULTICAST INTERNET PROTOCOL (IP) SESSION

TECHNICAL FIELD

This invention relates to data communications, and more particularly, to providing a Unicast endpoint client on a Unicast network with the ability to access a Multicast session on an Multicast network.

BACKGROUND OF THE INVENTION

In conventional packet, frame or cell based systems there are typically two modes of communication: point-to-point (also known as Unicast) and point-to-multipoint (also known as Multicast). Multicast addresses typically differ from Unicast addresses in that they refer to an intermediate abstraction known as a group. All senders address their transmitted information to this group and all receivers are "tuned" to "listen" to that address to receive the information transmitted to that group by the senders. The senders of information are thus effectively de-coupled from the set of receivers. Senders do not need to know who the receivers are—they simply transmit packets addressed to the group. Similarly, receivers do not need to know who the senders are—they simply send a request to the network (routers) to join a specific group of interest.

Multimedia distribution and conferencing/collaboration systems are advantageously and efficiently supported by Multicast communication methods. As will be used herein, a specific Multicast communication is referred to as a session. In the prior art, it is not possible for Unicast endpoints to access Multicast sessions, due to the differences in addressing modes and receiving modes. This disadvantageously limits the ability of a user at a Unicast endpoint client to participate in sessions in which they have interest and in which they could be an active participant.

SUMMARY OF THE INVENTION

In accordance with the present invention, Unicast endpoint clients are enabled to access Multicast sessions. Furthermore, in accordance with the present inventions, Unicast endpoint clients are enabled to request network-based recording systems to perform recordings of the Multicast session on behalf of clients. Even furthermore, in addition to LAN attached endpoints, analog dial-up (e.g., 28.8 kbps) as well as ISDN Unicast endpoints are enabled to access appropriately bandwidth-reduced versions of nominally high bandwidth sessions.

Inter-connectivity between a Unicast client connected to a Unicast network and one or more Multicast clients connected to a Multicast network is effected through a Multicast-Unicast Server (MUS), in accordance with the present invention. Such a server obtains information about sessions on the Multicast network and makes such information available to the Unicast client on the Unicast network upon request by the client. Upon being presented with a list describing the subject matter of each session, the user at the Unicast client selects the session to which he or she wants to join, which causes the Multicast-Unicast server to join the appropriate session on behalf of the requesting client for each media type for which the joining client wants to be a participant. The server then sets a bi-directional Unicast User Datagram Protocol (UDP) stream between itself and the client. All packets then received by the server from the Unicast client are address-translated to the appropriate Multicast session address. In addition, all packets received by the server on the Multicast session address are address-translated and sent to the Unicast client. The Unicast client is then able to participate in the Multicast session as both a sender and a receiver of packets to and from other Unicast and Multicast clients which are active during the session. Further, such a Unicast client, if authenticated to do so, is capable of creating a new session, and of recording a session in the network for later retrieval and playback. Furthermore, transcoding and rate adapting gateways are deployed within the Multicast network that map existing sessions into low bandwidth versions. If the Unicast client is a dial-up user connected to the Unicast network over analog or ISDN facilities, these rate-controlled sessions can then be accessed by the dial-up users.

BRIEF DESCRIPTION OF THE DRAWINGS

FIG. 6 is a flowchart detailing the steps of a Unicast client recording a Multicast session; and FIGS. 7A and 7B together detail the steps of a Unicast client rate-adapting/transcoding a Multicast session.

DETAILED DESCRIPTION

Figure 1:
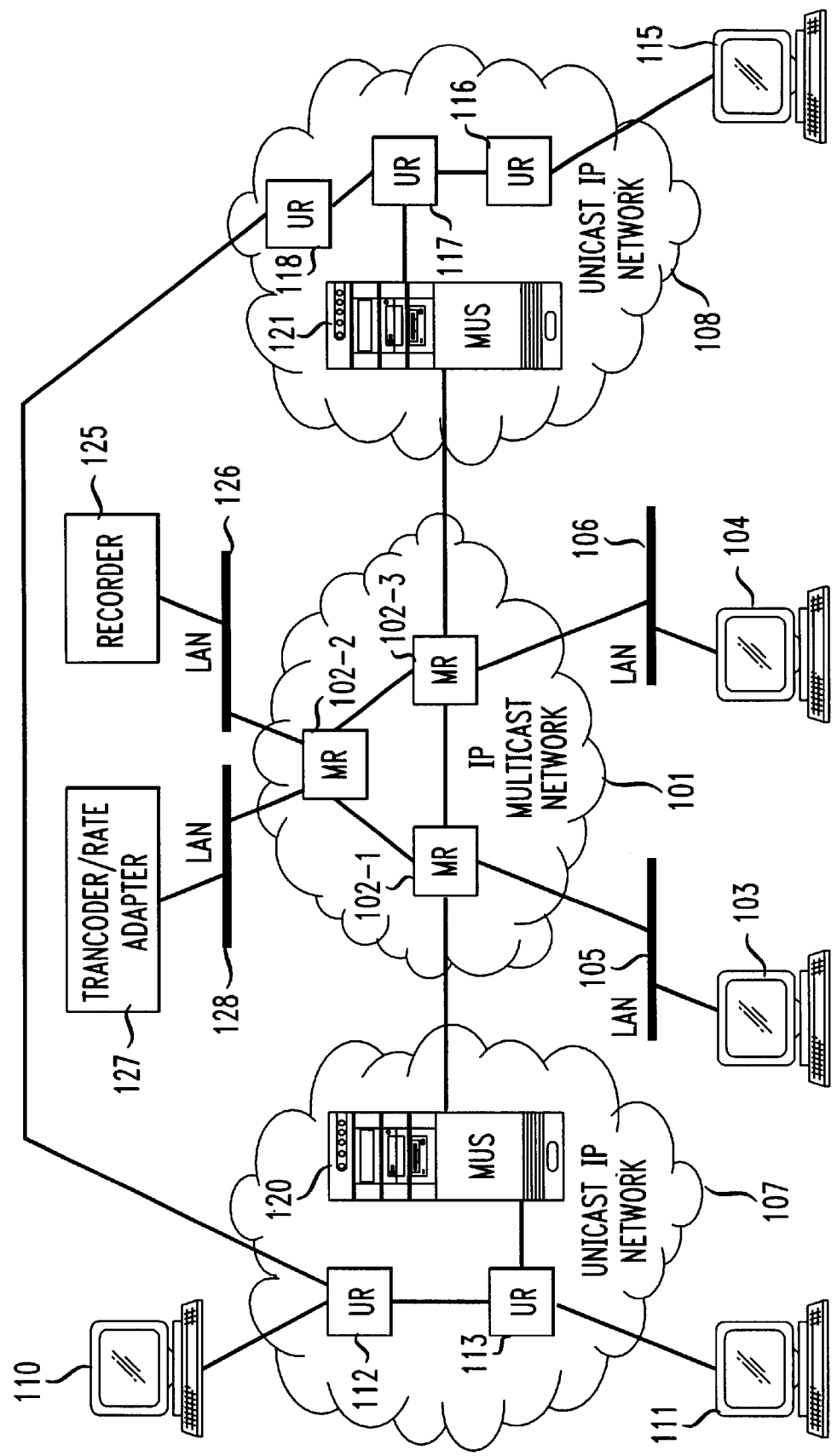
FIG. 1 is a block diagram showing Unicast clients connected on a Unicast Internet Protocol (IP) network accessing an IP Multicast network through Multicast-Unicast Servers (MUS's)

With reference to FIG. 1, an IP Multicast network 101 is shown including, as way of illustration, three interconnected Multicast Routers (MR) 102-1, 102-2, and 102-3. A well known currently in place IP Multicast network is the so-called MBONE (Multicast Backbone), which is a public shared IP Multicast network spanning many countries and covering thousands of IP sub-networks. In addition to the MBONE, numerous private Intranets also use Multicast IP for intra-corporate communications. A plurality of multimedia client terminals are connected to IP Multicast network 101, for example the MBONE. For way of illustration only, in FIG. 1 two client terminals 103 and 104 are shown connected to network 101 through respective Local Area Networks (LANs) 105 and 106, respectively. Each LAN is connected through a customer premises router (not shown) over, for example, a T1 line, Frame Relay (FR), ATM, or an X.25 connection. In accordance with Multicast communication, a sender of information of a particular media type transmits packets of information to a particular address, which are then automatically distributed to each of the members of a group that have requested to receive from that address. Advantageously, the network performs the replication functions necessary so that each receiver client of the group can receive the packets transmitted to the address by a sender or senders.

In accordance with the present invention, Unicast client terminals connected to a Unicast IP network are capable of joining in and participating with a Multicast session on an IP Multicast network. FIG. 1 shows two Unicast IP networks 107 and 108. Illustrative Unicast client terminals 110 and 111 are connected to network 107 through conventional Unicast Routers (URs) 112 and 113, respectively. Unicast client terminal 115 is connected to UR 116 within network 108. UR 116 in turn is shown connected to another UR, UR 117 for example, which in turn is connected to UR 118. Networks 107 and 108 are shown as being interconnected through UR 112 and 118, thus enabling Unicast IP communication between a client terminal connected to Unicast IP network 107and a client terminal connected to Unicast IP network 108. The Unicast client terminals 110, 111 and 115, for example, can be connected to networks 107 or 108 over a Plain Old Telephone Service (POTS) dial-up connection, an ISDN connection or an Asynchronous Digital Subscriber Loop (ADSL) connection, each to a Local Exchange Carrier (LEC) (not shown) and from there to an Internet Service Provider (ISP) (not shown), which in turn is connected to the Unicast IP network through a Unicast Router. Alternatively, a client terminal can be connected to an ISP through a cable modem over cable facilities through a cable TV provider. Even further, the Unicast client terminal could be connected to a LAN and to a customer premises router to a UR over, for example, a Wide Area Network (WAN), T1 facilities, Frame Relay, ATM, or X.25. In accordance with this invention, Unicast client terminals 110, 111, 115, for example, on Unicast IP networks 107 and 108, can participate in a Multicast IP session on IP Multicast network 101. Specifically, such functionality is enabled through Multicast-Unicast Servers (MUS's), such as MUS 120 in network 107 and MUS 121 in network 108, which each interconnect their respective Unicast IP networks 107 and 108, with the IP Multicast Network 101.

The Multicast-Unicast Servers 120 and 121 function as gateways that enable those Unicast-connected clients on their respective Unicast IP networks to access IP Multicast network 101. Specifically, each MUS through interaction with client software on the Unicast client on the Unicast IP network enables such client to join a group on the IP Multicast network by providing information relating to what sessions are in progress or scheduled on network 101. The MUS then receives and sends data on those groups within a session selected by client on behalf of the client. Thus, the MUS functions to convert the address of the Multicast IP packets of a requested-for group to the Unicast IP endpoint address of the requesting client. Furthermore, the MUS functions to transmit packets it receives from the Unicast endpoint client to a list of any other Unicast endpoint receivers for the requested-for Multicast group on the same Unicast IP network or an interconnected Unicast IP network (107 or 108), as well as to the Multicast group address itself on the IP Multicast network 101 to enable the Multicast endpoints, 103 and 104, for example, connected on that network to receive packets originating from the Unicast client.

Figure 2:
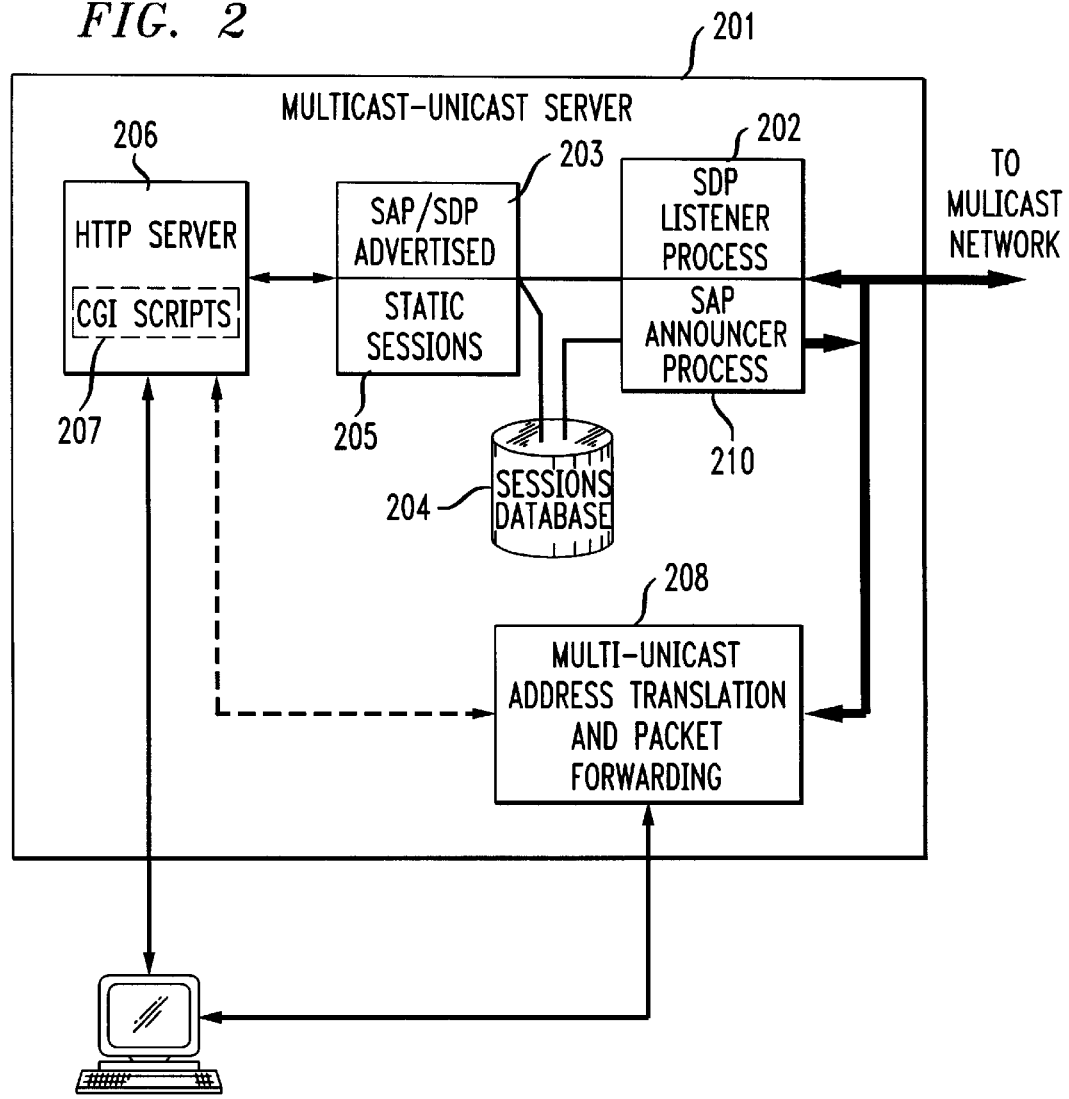
FIG. 2 is a block diagram of a MUS.
Figure 3:
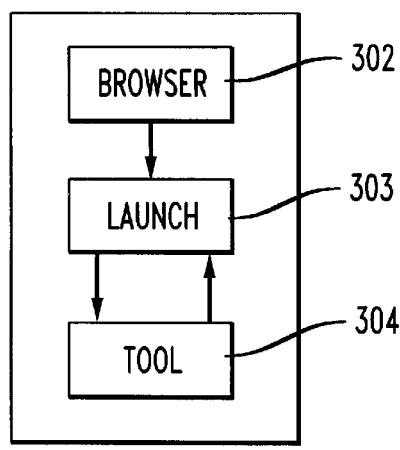
FIG. 3 shows the software components of a client terminal that enable the client to access a Multicast session.

FIGS. 2 and 3 are block diagrams of an MUS 201 and a client terminal 301, respectively, showing their functions that enable them to operate in accordance with the present invention. In FIG. 2 a Session Description Protocol (SDP) listener process 202 coupled to the IP Multicast network 101 listens for session announcements transmitted on Multicast network 101. Such directory announcements are repeatedly sent over the IP Multicast network 101. These "advertised" sessions are received by the SDP/SAP advertised process 203 and stored in a sessions database 204. Other sessions that are not announced and thus not received by the SDP listener process 202, are entered by a system administrator through a static sessions process 205 and also stored in sessions database 204. An example of the latter might be a weather channel that is always present on a predetermined socket and is not repeatedly announced over the IP Multicast network 101.

An HTTP server 206 can read the sessions database 204 so that when a client connects to the server, the client is able to receive a listing of those Multicast sessions presently on the IP Multicast network 101. When the client connects to the server 206, the server executes a CGI (Common Gateway Interface) scripts 207 within the HTTP server 206 on behalf of the client to present the information pertaining to the sessions to the client. Such information is presented back to the client 301 (FIG. 3) through its web browser program 302 (in FIG. 3). The client initiates a request to join a session by selecting a URL on an HTML web page presented to it by HTTP server 206. A message is thus sent from the client 301 by web browser 302, which when received by server HTTP 206 causes it to invoke certain actions. Specifically, HTTP server 206 sends a response back to the client comprising a control message containing information indicating what tool needs to be used in order to join the selected session. Such tools are well known in the art and may include, for example, the Visual Audio Tool (VAT), the Visual Conference Tool (VIC), or the Internet Protocol Television Tool (IPTV). Furthermore, the message indicates where the tools should be connected, i.e., specifically, to which socket on the MUS the tool should be connected. On the client side, the client 301 then launches from launch program 303 the specified tool from tool program 304 to the indicated sockets on the MUS 201. CGI scripts program 207 then initiates the translation/packet-forwarding server 208 within MUS 201 to join the requested Multicast group or groups (one group per selected media type) associated with the selected session. CGI scripts 207 that initiated such join action to take place then adds that client's Unicast address to a list of receivers for the requested Multicast group or groups. Server 208 then forwards Multicast packets received from the client to the list of receivers for each joined group and translates the Multicast address of packets received from the joined group to the Unicast address of the joining client.

Figure 4:
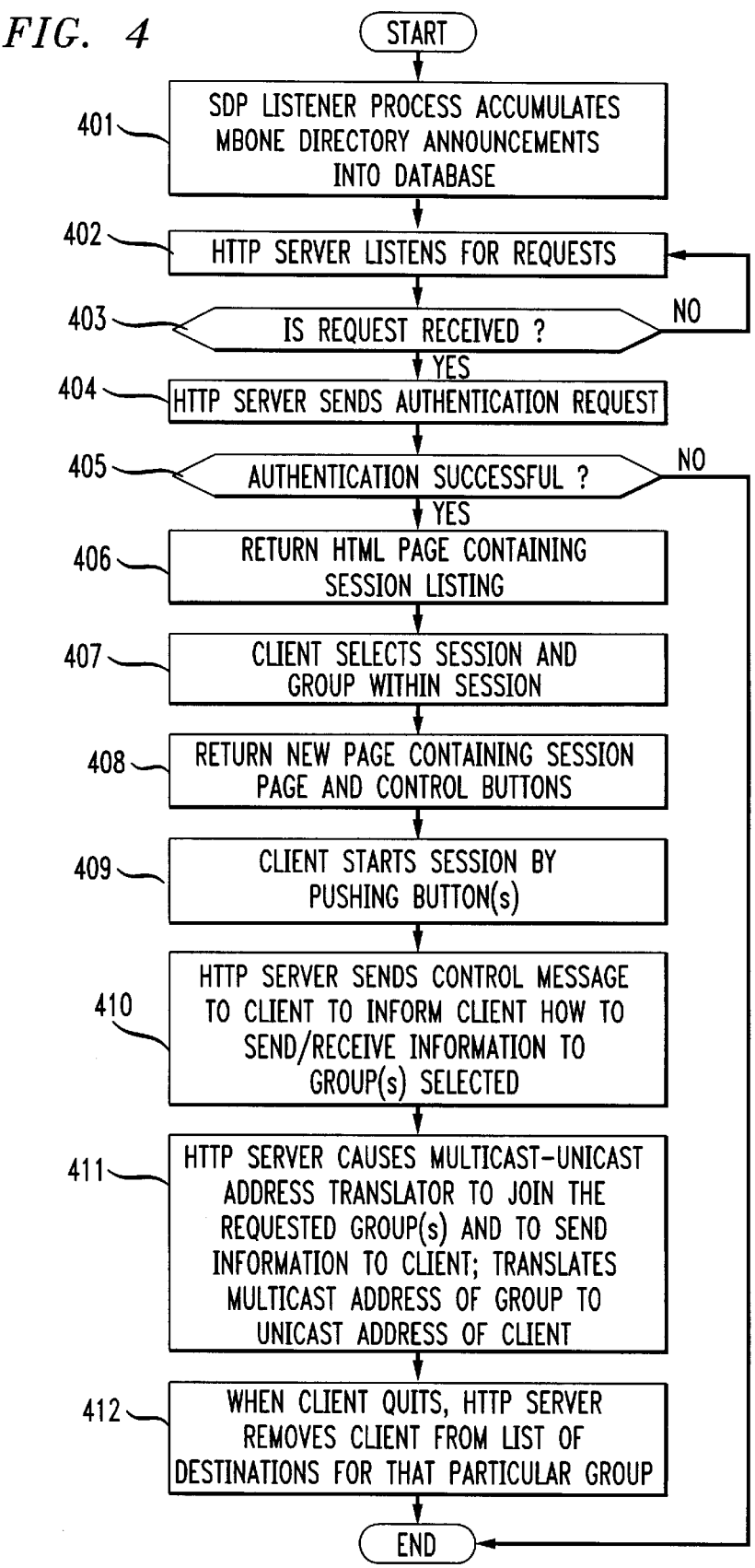
FIG. 4 is a flowchart detailing the steps associated with a Unicast client joining a Multicast session on the Multicast network.

The steps associated with a client joining a session are detailed with reference to the flowchart in FIG. 4. At step 401, the SDP listener process accumulates IP Multicast network 101 directory announcements into database 204. The database is filtered and converted into a standard HTML page, where each URL points to information pertaining to each Multicast session in the filtered database. At step 402, the HTTP server 206 listens for requests for Multicast sessions/URLs on the HTML page which contains a list of URLs describing the sessions. At step 403, a request is received from a client for a copy of the page containing the Multicast sessions. At step 404, the HTTP server 206 sends a message back to the client requesting the to enter a login id and a password for authentication purposes. If the user is successfully authenticated at step 405, at step 406, server 206 returns a page to the client containing a list of sessions. When, at step 407, the user of the client browses the page and requests a session indicated by a URL, at step 408, server 206 returns a page containing details of the session and buttons enabling the client to request the session to start, as well as other functions to be described later herein. At step 409, the client starts a selected session (or specific media in the session) by "pressing" a button on the HTML page. The server 206 then launches a control script 207. At step 410, the control script 207 sends a response to the client containing information about which multimedia tool to launch, and what UDP sockets (the Unicast IP address on the MUS and associated ports) to listen to and to send information to corresponding to the requested group. It can be assumed that at least one socket is used. A second socket may be used to send control/status information from each member of the Multicast group. At step 411, the same control script 207 of server 206 causes the Multicast-to-Unicast gateway to join the requested-for Multicast group and adds the requesting client to the list of receivers for the requested for Multicast group. For each requesting client, server 206 also converts the address of the Multicast IP packets of the requested-for group to the Unicast IP address of the requesting client, and sends the Unicast IP packets to the requesting client using the well-known User Datagram Protocol (UDP). Server 206 also transmits any packets it receives from the client to any other Unicast client on that Multicast group, as well as to the Multicast group address itself on the IP Multicast network 101. At step 412, when the client exits from the multimedia tool, server 206 detects that status messages from the client are no longer being sent and removes the client from the list of destinations for the particular Multicast group.

Figure 5:
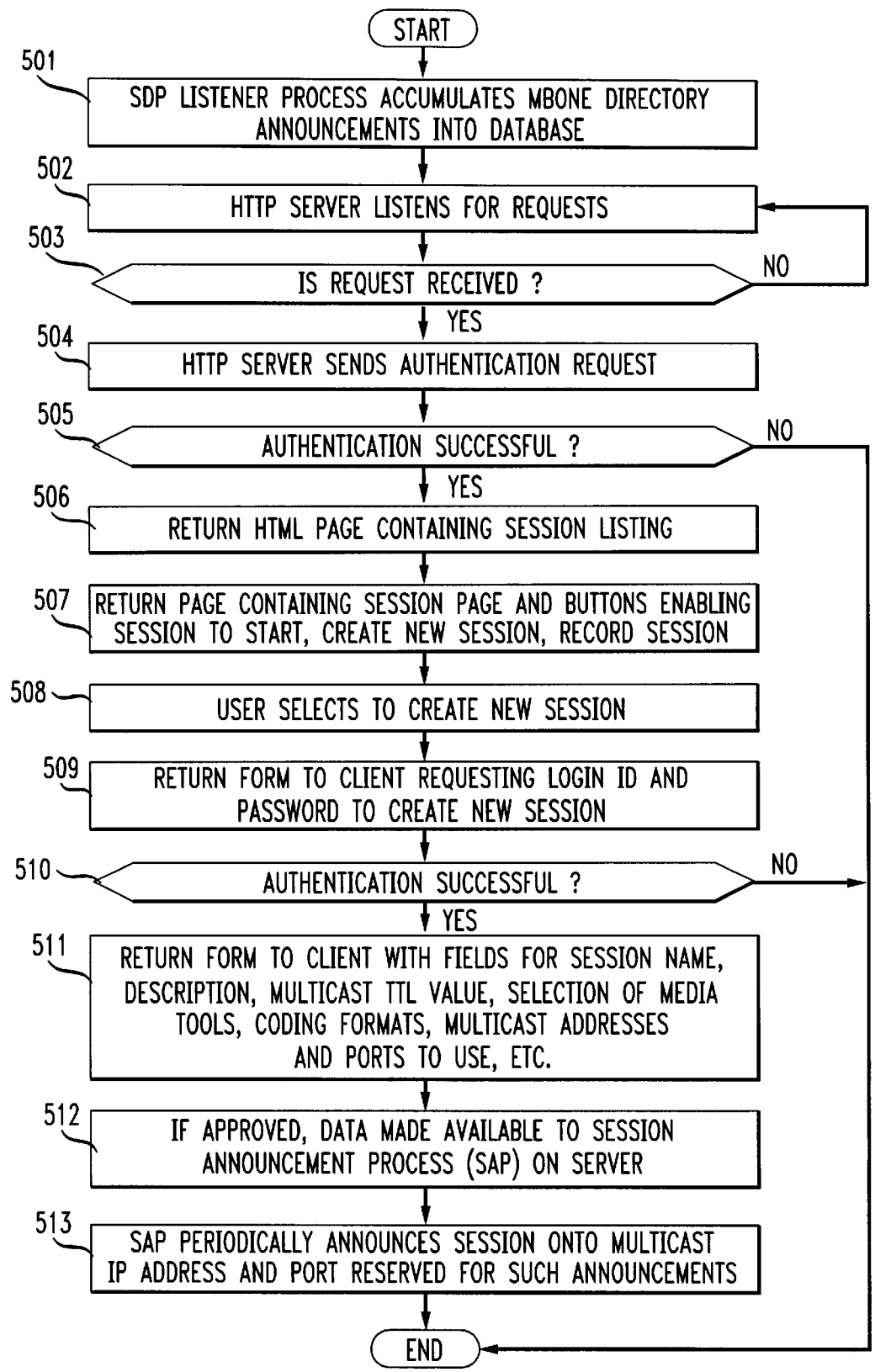
FIG. 5 is a flowchart detailing the steps of a Unicast client creating a Multicast session.

The steps associated with a client creating a new session are detailed in FIG. 5. At step 501, as previously described in connection with the steps in FIG. 4 associated with a client joining a session, the SDP listener process 202 accumulates IP Multicast network 101 directory announcements into database 204. The database is filtered and converted into a standard HTML page, where each URL points to information pertaining to each Multicast session in the filtered database. At step 502, the HTTP server 206 listens for requests for Multicast sessions/URLs on the HTML page which contains a list of URLs describing the sessions. When a user of a client requests a copy of the page containing the Multicast sessions at step 503, the server 206, at step 504, sends a message back to the client requesting a login id and password for authentication purposes. If authentication is successful at step 505, at step 506, server 206 returns a page to the client containing a list of sessions. When the user browses that page and requests a specific URL, server 206, at step 507, returns a page containing details of the session and buttons enabling the client to request a session to start, to create a new session, to edit or delete an existing session, and to record the current session, the later functionality to be described hereinafter. When, at step 508, the user "presses" a button to create a new session, at step 509, server 206 returns a form to the client requesting the client to enter a login id and password appropriate for creating a new session, which may or may not be the same as the login id and password associated with the initial authentication process. If, at step 510, the client is authenticated for session creation, server 206 returns at step 511 a form to the client with fields to be filled in by the user for the session name, session description, a URL address for more detailed or related information, a field to set the Multicast packet Time to Live value (TTL), selection boxes for various media tools, and associated coding formats, Multicast addresses and ports to use, the name and phone number of a responsible person, and the duration of the session announcement. When the user fills in the fields and selects a create button, the filled-in form is returned to the server 206. Server 206 checks that certain key fields are correct and filled in. If not, an error message is returned to the client; otherwise server 206 stores the data in a file that is indexed to the login id used to access the form. The data, at step 512, is then made available to a Session Announcement Protocol (SAP) process 210 on MUS 201. At step 513, the SAP process 210 periodically announces the session onto a well-known Multicast IP address and port reserved for such announcements for a period of time equal to the duration field as entered in the form. When this time period expires, the SAP process 210 ceases to announce the session.

A Unicast endpoint can also, in accordance with the present invention, request that a session be recorded for later rebroadcast or retrieval on demand. To effect such recording, in FIG. 1, a recorder 125 is connected via LAN 126 to the IP Multicast network 101. The flowchart in FIG. 6 details the steps associated with a user at a client terminal requesting that a session be recorded. As described previously, the client must be given a login id and password to enable access to the HTTP server 206 which has a list of the IP Multicast sessions. At step 601, the SDP listener process 202 accumulates IP Multicast network 101 directory announcements into sessions database 204. The database is filtered and converted into a standard HTML page, where each URL points to information pertaining to each Multicast session in the filtered database. At step 602, server 206 listens for requests for Multicast sessions/URLs on the HTML page which contains a list of URLs describing the sessions. When, at step 603, a user requests a copy of the page containing the Multicast sessions, at step 604, server 206 sends a message back to the client requesting his or her login id and password for authentication purposes. If, at step 605, authentication is successful, at step 606, server 206 returns a page to the client containing a list of sessions. When a user browses that page and requests a URL, server 206, at step 607, returns a page containing details of the session, and buttons enabling the client to request a session, to start the existing session, to create a new session, to edit or delete an existing session, or to record the current session. At step 608, the user "presses" a button to record a session and, at step 609, server 206 returns a form to the client requesting the user to enter a login id and password for recording purposes, which may or may not be the same as the login id and password used in a previous step. If, at step 610, the client is authenticated for session recording, server 206 returns a form to the client with fields to be filled in or options to be selected. The form contains selection boxes for the various media of the session, and start and stop date and time fields, as well as a start button to "push" when the form is complete. When the user fills in the fields and selects the start form, the filled-in form is returned to server 206. Server 206 checks that certain key fields are correct and filled in. If not, an error message is returned to the client; otherwise the server stores the data in a file that is indexed to the login id used to access the form. At step 611, server 206 sends a message to the recording server 125 to start the recording at the specified date and time. The recording server 125, at step 612, then records the session at the appropriate time using a well-known program for reading IP Multicast packets in the RTP format. At step 613, the stored session is retrieved on-demand by the user.

To support dial-up Unicast endpoint users, prior art transcoding and rate adapting gateways, such as transcoder/adapter 127 in FIG. 1, are deployed within IP Multicast network 101. As shown in FIG. 1, transcoder/rate adapter gateway 127 is connected via LAN 128 to the IP Multicast network 101. Alternatively, transcoder/rate adapter gateway 127 may be co-resident with either MUS 120 or 121. The gateway maps existing high bandwidth sessions into low bandwidth versions of the same session suitable for 28.8 kbps modems or ISDN adapters by using frame discarding algorithms. Announcements about these rate-controlled sessions are then placed in the database of IP Multicast network 101 sessions.

An alternative mechanism for invoking the transcoding/rate adapting gateways could be based on user/client action.

Figure 7A:
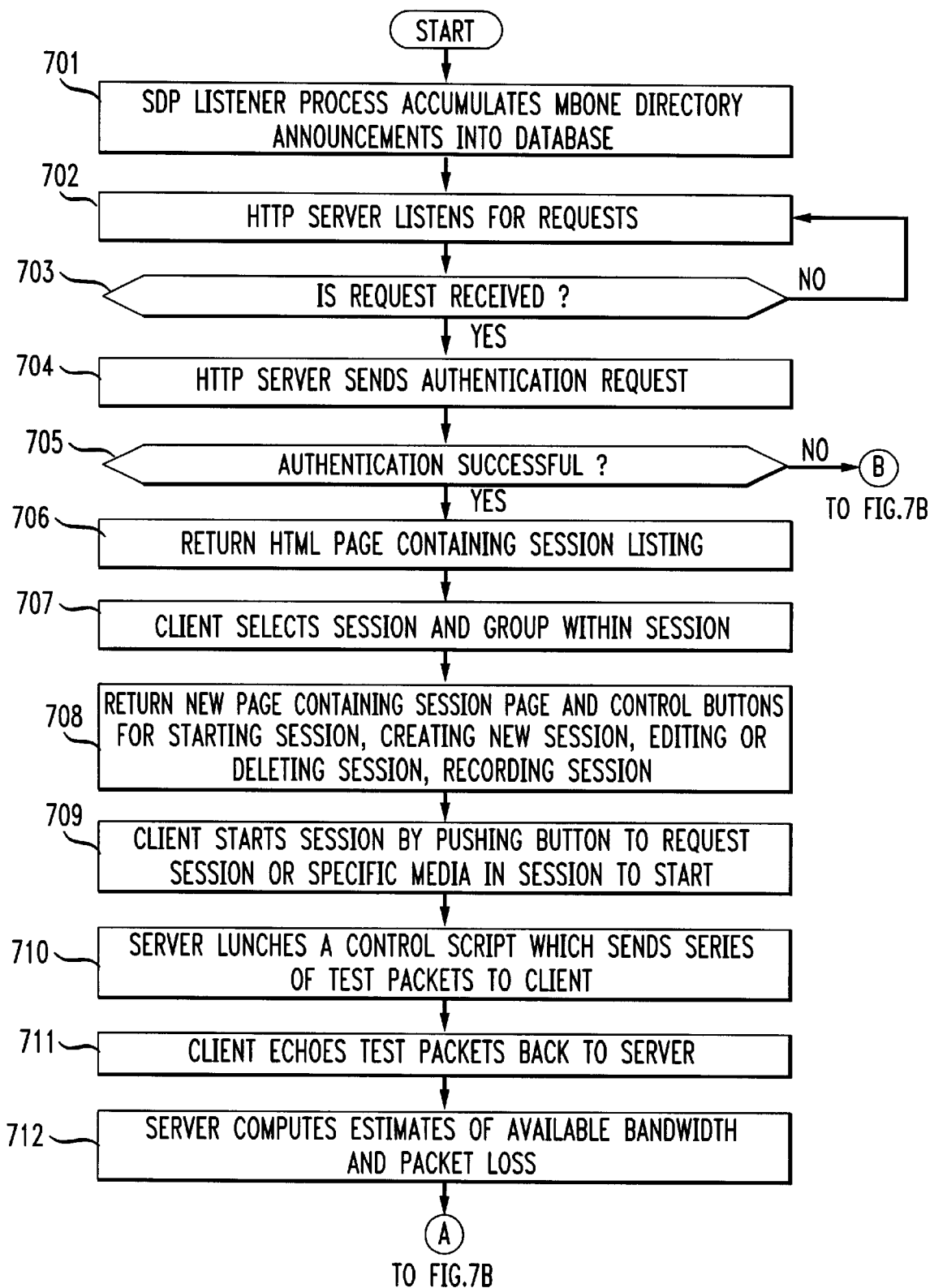

The steps associated with a client requesting that a session be automatically transcoded/rate adapted are detailed in FIGS. 7A and 7B. As described previously, the user of the client must be given a login id and a password to enable access to HTTP server 206. As described previously, at step 701, the SDP listener process 202 accumulates IP Multicast network 101 directory announcements into database 204. The database is filtered and converted into a standard HTML page, where each URL points to information pertaining to each Multicast session the filtered database. It is assumed that a required bandwidth parameter and maximum packet loss parameter are associated with each session. For sessions using a form as previously described, this is accomplished by the use of additional fields corresponding to these parameters in the "new session" form described hereinabove. At step 702, HTTP server 206 listens for requests for Multicast sessions/URLs on the HTML page containing a list of URLS describing the sessions. When, at step 703, a request is received from a client for a copy of the page containing the Multicast sessions, at step 704, server 206 sends a message back to the client requesting a login id and password for authentication purposes. If, at step 705, authentication is successful, at step 706, server 206 returns a page to the client containing a list of sessions. When after the user browses the page, and at step 707, selects a session and group(s) within a session, server 206, at step 708, returns a page containing details of the session and buttons enabling the client to request a session to start, to create a new session, to edit or delete an existing session, or to record the current session. At step 709, the user pushes a button to request the session or specific media in the session to start. In response thereto, at step 710, server 206 launches a control script which sends a series of test packets to the client. At step 711, the client echoes these same packets back to the server 206. At step 712, the server computes an estimate of the available bandwidth and packet loss along the path between the server and the client by comparing the transmitted test packets with the received test packets. If, at decision step 713, the performance requirements of the session exceed that of the path, at step 714, rate-adaptation or transcoding is needed. If not, the process continues as previously described for a client joining an existing session. If rate adaptation or transcoding is needed, at step 715, one out of plurality of lower rate encodings is selected based on the measured characteristics of the path. It is to be assumed that a finite set of rate adapted sessions are allowed by the server 206. As an example, if the original session was 128 kbps, rate adaptation to 56 kbps, 28.8 kbps and 20 kbps may be allowed. At step 716, HTTP server 206 sends a message to the transcoding/rate adapting gateway 127 indicating which Multicast group is to be joined, to what bandwidth the media-type should be rate-adapted, what (if any) alternative coding needs to applied, and what new Multicast address and port number the transcoded session should use. At step 717, a determination is made whether that group has already been rate-adapted/ transcoded. If yes, at step 718, the Multicast address and port number corresponding to the already rate-adapted/ transcoded group is used and the process proceeds to step 719. If no, at step 720, the transcoder/rate adapter gateway 127 is invoked to transcode the session with appropriate bandwidth parameters and to re-Multicast the resulting lower-bandwidth session using a different Multicast address and port number. At step 719, the server 206 sends a message to the client containing information about which multimedia tool to launch, and what UDP sockets (the Unicast IP address on the MUS and associated ports) to listen to and to send information to corresponding to the requested session. At step 721, the control-script causes the MUS gateway to join the requested Multicast group and add the requesting client to the list of receivers for requested Multicast group. For each requesting client, the server converts the address of the Multicast IP packets of the requested-for group to the Unicast IP address of the requesting client, and sends the Unicast IP packets to the requesting client using the well-known User Datagram Protocol. The server also transmits any packets it receives from the client to the list of receivers for that Multicast group, as well as to the Multicast group address itself. At step 722, when the client exits the multimedia tool, the HTTP server 206 detects that status messages from the client are no longer being sent and removes the client from the list of destinations for the particular Multicast group.

The system described hereinabove is highly scaleable in that the MUS and other servers may be distributed throughout the Multicast-enabled portion of the network. If the number of such endpoints is likely to be large, for efficiency, it is preferred that the servers be located close to the Unicast client endpoints. For small conferencing group, the location or distribution of the MUS's is not important. Advantageously, the present invention enables any IP Multicast-based service to be gradually introduced and rolled out on a small scale before all clients are enabled for IP Multicast. As clients become IP Multicast enabled, there could be a transition to a hybrid IP Multicast mode of operation where some clients are IP Multicast connected and others are not.

Although described in connection with Unicast IP endpoints connecting to an IP Multicast network 101 such as the MBONE, the present invention could be employed with any IP Multicast network. Further the present invention could be employed with any Multicast network and Unicast network that operate in a similar fashion to IP Multicast and Unicast networks.

The above-described embodiments are illustrative of the principles of the present invention. Other embodiments could be devised by those skilled in the art without departing from the spirit and scope of the present invention.

The invention claimed is:

1. A method of providing access to a Multicast session on a Multicast network to a Unicast client on a Unicast network comprising:

accumulating at a gateway server interconnecting the Multicast network and the Unicast network directory information relating to Multicast sessions on the Multicast network;

supplying the Unicast client with the directory information accumulated by the gateway server;

receiving at the gateway server from the Unicast client a request to join a selected session chosen from the directory information;

joining the requested-for Multicast session at the gateway server on behalf of the Unicast client;

converting at the gateway server an address of Multicast packets received on a Multicast address associated with the requested-for session to a Unicast address of the Unicast client and sending the Multicast packets received by the gateway server on the Multicast address to the Unicast client; and transmitting packets received at the gateway server from the Unicast client to the Multicast address associated with the requested-for session.

2. The method of claim 1 wherein the request to join a Multicast session is a request to join at least one group of a plurality of groups associated with the Multicast session, each of said plurality of groups having an associated Multicast address.

3. The method of claim 2 wherein each of said at least one group is associated with a different media type.

4. The method of claim 1 further comprising authenticating the Unicast client before supplying the Unicast client with the directory information.

5. The method of claim 4 wherein the authenticating comprises receiving at the gateway server a login identity and a password from the Unicast client.

6. The method of claim 1 wherein the Unicast and Multicast networks are IP (Internet Protocol) Unicast and IP Multicast networks, respectively.

7. The method of claim 6 wherein packets are transmitted between the gateway server and the Unicast client using the User Datagram Protocol.

8. The method of claim 6 wherein the directory information comprises an HTML page having a plurality of URLs each pointing to information associated with a Multicast session on the IP Multicast network.

9. The method of claim 6 wherein the IP Multicast network is the MBONE.

10. A Multicast-Unicast server comprising:
   means for accumulating from a connected-to Multicast network directory information relating to Multicast sessions on the Multicast network;
   means for receiving from a Unicast client on a Unicast network connected to the server a request to join a Multicast session from among the Multicast sessions accumulated in the directory information;
   means for joining the requested-for Multicast session on behalf of the client; and
   means for converting the Multicast address of the Multicast packets on the requested-for Multicast session to a Unicast address associated with the Unicast client and for sending the Multicast packets on the requested-for Multicast session to the Unicast client at that Unicast address, and for sending packets received from the Unicast client to the Multicast address associated with the selected session.

11. The server of claim 10 wherein the Multicast network and the Unicast network the server is connected to are an IP (Internet Protocol) Multicast network and an IP Unicast network, respectively.

12. The server of claim 11 wherein packets are transmitted between the server and the Unicast client using the User Datagram Protocol.

13. The server of claim 10 wherein the request to join a Multicast session is a request to join at least one group of a plurality of groups associated with the Multicast session, each of plurality of groups having an associated Multicast address.

14. The server of claim 13 wherein each of said plurality of groups is associated with a different media type.

15. The server of claim 10 wherein the means for converting also sends packets received from the Unicast client to another Unicast client associated with the server and which said another client is also connected to the session.

* * * * *